(12) United States Patent
Hamabe et al.

(10) Patent No.: US 9,084,202 B2
(45) Date of Patent: Jul. 14, 2015

(54) WIRELESS COMMUNICATION SYSTEM, BASE STATION, RADIO RESOURCE MANAGEMENT METHOD, AND CONTROL PROGRAM OF BASE STATION

(75) Inventors: Kojiro Hamabe, Minato-ku (JP); Motoki Morita, Minato-ku (JP)

(73) Assignee: NEC CORPORATION, Tokyo (JP)

( * ) Notice: Subject to any disclaimer, the term of this patent is extended or adjusted under 35 U.S.C. 154(b) by 679 days.

(21) Appl. No.: 12/738,925

(22) PCT Filed: Sep. 16, 2008

(86) PCT No.: PCT/JP2008/066630
§ 371 (c)(1),
(2), (4) Date: Apr. 20, 2010

(87) PCT Pub. No.: WO2009/054205
PCT Pub. Date: Apr. 30, 2009

(65) Prior Publication Data
US 2010/0238905 A1    Sep. 23, 2010

(30) Foreign Application Priority Data

Oct. 22, 2007  (JP) ................. 2007-273640

(51) Int. Cl.
*H04W 52/24*   (2009.01)
*H04W 52/32*   (2009.01)
(Continued)

(52) U.S. Cl.
CPC .......... *H04W 52/242* (2013.01); *H04W 52/244* (2013.01); *H04W 52/325* (2013.01);
(Continued)

(58) Field of Classification Search
USPC ............. 370/310.2, 311, 312, 314, 318, 328, 370/332, 335, 342, 461; 375/346; 342/357.28, 357.29, 357.4, 357.49, 342/357.59; 455/446, 456.1–456.6, 41.2, 455/513, 522, 524, 525, 63.1, 67.133, 455/114.2, 115.1–115.4, 161.3, 455/226.1–226.4
See application file for complete search history.

(56) References Cited

U.S. PATENT DOCUMENTS 6,597,678 B1   7/2003 Kuwahara et al.
7,756,542 B1 *  7/2010 Kaiser et al. .................. 455/522

(Continued)

FOREIGN PATENT DOCUMENTS

CN    1474606 A    2/2004
CN    1555143 A    12/2004

(Continued)

OTHER PUBLICATIONS

3GPP TS 25.214 v7.3.0 (Dec. 2006), Technical Specification, 3rd Generation Partnership Project; Technical Specification Group Radio Access Network; Physical layer procedures (FDD) (Release 7), 3GPP, Dec. 2006, pp. 1-106.

(Continued)

*Primary Examiner* — Benjamin H Elliott, IV
(74) *Attorney, Agent, or Firm* — Sughrue Mion, PLLC

(57) ABSTRACT

To provide appropriate communication quality inside a building regardless of the building penetration loss of the building in which a femto base station is installed while suppressing the interference caused by radio waves leaked outside the building, a femto base station 4 receives a radio signal that passes through a structure and arrives at the installation place of the femto base station 4 (e.g., radio signal transmitted from a Global Positioning System) and estimates the penetration loss L of the structure based on the receiving state of the radio signal. Further, the femto base station 4 performs radio resource management based on an estimation result of the penetration loss L, and communicates with a mobile station 7-2.

30 Claims, 8 Drawing Sheets

(51) Int. Cl.
*H04W 52/14* (2009.01)
*H04W 52/36* (2009.01)
*H04W 84/04* (2009.01)

(52) U.S. Cl.
CPC .......... *H04W52/143* (2013.01); *H04W 52/146* (2013.01); *H04W 52/367* (2013.01); *H04W 84/045* (2013.01)

(56) References Cited

U.S. PATENT DOCUMENTS

| | | | |
|---|---|---|---|
| 7,907,588 B2* | 3/2011 | Schaepperle et al. | 370/344 |
| 2002/0119797 A1* | 8/2002 | Woodhead et al. | 455/522 |
| 2002/0193115 A1* | 12/2002 | Furukawa et al. | 455/442 |
| 2005/0017898 A1* | 1/2005 | Teranishi | 342/357.1 |
| 2005/0069044 A1* | 3/2005 | Iacono et al. | 375/259 |
| 2005/0085191 A1* | 4/2005 | Iacono et al. | 455/67.11 |
| 2006/0025072 A1* | 2/2006 | Pan | 455/11.1 |
| 2006/0092887 A1* | 5/2006 | Iacono et al. | 370/335 |
| 2006/0165032 A1* | 7/2006 | Hamalainen et al. | 370/328 |
| 2006/0262841 A1* | 11/2006 | Vaisanen et al. | 375/227 |
| 2007/0042799 A1 | 2/2007 | Jubin et al. | |
| 2007/0155314 A1* | 7/2007 | Mohebbi | 455/11.1 |
| 2007/0171809 A1* | 7/2007 | Pajukoski et al. | 370/208 |
| 2007/0218949 A1* | 9/2007 | Cleveland | 455/561 |
| 2007/0258417 A1* | 11/2007 | Harvey et al. | 370/338 |
| 2008/0026763 A1* | 1/2008 | van Rensburg et al. | 455/446 |
| 2009/0029713 A1* | 1/2009 | Dharia et al. | 455/450 |
| 2009/0042593 A1* | 2/2009 | Yavuz et al. | 455/522 |
| 2009/0156247 A1* | 6/2009 | Claussen et al. | 455/522 |
| 2010/0238905 A1* | 9/2010 | Hamabe et al. | 370/335 |

FOREIGN PATENT DOCUMENTS

| | | |
|---|---|---|
| GB | 2 428 937 A | 2/2007 |
| JP | 2000-224097 A | 8/2000 |
| JP | 2004-508781 A | 3/2004 |
| JP | 2006-304355 A | 11/2006 |
| JP | 2007-527658 A | 9/2007 |
| WO | 98/09465 A1 | 3/1998 |
| WO | 0221870 A2 | 3/2002 |
| WO | 2005057233 A2 | 6/2005 |

OTHER PUBLICATIONS

3GPP TS 36.300 v8.1.0 (Jun. 2007), Technical Specification, $3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8); 3GPP, Jun. 2007, pp. 1-106.

Office Action dated Dec. 12, 2012, issued by the State Intellectual Property Office of P.R. China in counterpart Chinese Application No. 200880112716.3.

Office Action dated Jun. 4, 2013 issued by the Japanese Patent Office in counterpart Japanese Patent Application No. 2009-538009.

Extended European Search Report, dated Apr. 11, 2014, issued by the European Patent Office, in counterpart Application No. 08841475.0.

Alcatel-Lucent, "Stimulation results of macro-cell and co-channel Home NodeB with power configuration and open access", 3GPP TSG-RAN WG4 (Radio) Meeting #44bis, R4-071578, Shanghai, China, Oct. 8-12, 2007, 6 pages.

* cited by examiner

WIRELESS COMMUNICATION SYSTEM, BASE STATION, RADIO RESOURCE MANAGEMENT METHOD, AND CONTROL PROGRAM OF BASE STATION

TECHNICAL FIELD

The present invention relates to a wireless communication system, in particular a wireless communication system in which at least one of base stations autonomously performs radio resource management, a base station, a radio resource management method, and a control program of a base station.

BACKGROUND ART

In recent years, as the demand for indoor voice communication and data communication has grown due to the spread of mobile phones, the development of a home-use base station installed indoors has been pursued. As a form of operation of such a home-use base station, a way of implementing communication in which only a pre-registered mobile phone(s) is connected to a home-use base station has been studied. Since a range covered by a home-use base station is considerably smaller than that of a base station installed outdoors, the range is called "femtocell". Accordingly, a home-use base station is referred to as "femto base station" hereinafter.

Femto base stations as well as base stations in existing mobile communication networks transmit a common pilot signal. A mobile station performs synchronization establishment, channel estimation, and the like by receiving such a common pilot signal, and then performs data transmission/reception with a base station. Therefore, it is necessary to be able to receive a common pilot signal with appropriate receiving quality in a mobile station in order to provide appropriate communication quality.

In base stations in existing mobile communication networks, the transmission power of a common pilot signal to be transmitted in each cell is set in advance to a fixed value. In contrast to this, for common pilot signals transmitted by femto base stations in femtocells, a way of autonomously setting the transmission power by a femto base station has been studied. Patent document 1 (page 14, line 8 to page 15, line 21) discloses a method like this.

Its specific example is explained with reference to FIG. 8. Referring to FIG. 8, a macro base station 81 forms a macrocell 801 and transmits a common pilot signal CP1 with a constant transmission power to communicate with a mobile station (not shown). Femto base stations 812A and 812B form femtocells 802A and 802B respectively. Further, each of the femto base stations 812A and 812B measures a received power Pmacro [dBm] of the common pilot signal CP1 of the macro base station 811, and they transmit common pilot signals CP2A and CP2B respectively with a transmission power Pmacro+Poffset [dBm] by using the same radio frequency as that of the macro base station 811 to communicate with a mobile station (not shown). Note that Poffset is a constant value common to all the femtocells 802A and 802B.

Further, as data transmission from a base station to a mobile station on the downlink is speeded up, data transmission from the mobile station to the base station on the uplink is also speeded up. For the speedup on the uplink from a mobile station to a base station of these speeding-up schemes, the data transmission speed is maximized by maximizing the transmission power of the mobile station within the range in which the total amount of the received power (RTWP: Received Total Wideband Power) in the base station remains at or below a predetermined target value.

The femto base station like the one described above has been studied for use in systems such as WCDMA and E-UTRAN. In WCDMA, data transmission is performed by using an dedicated channel, of which transmission power is controlled, on an uplink and a downlink, or is performed by using a shared channel on a downlink as shown in Non-patent document 1. Further, in E-UTRAN, a radio frequency band is divided into a plurality of PRBs (Physical Resource Blocks) as shown in Non-patent document 2. A scheduler provided in an E-UTRAN base station assigns PRBs, and a base station performs data transmission with a mobile station by using an assigned PRB.

[Patent Document 1]
UK Patent Application Publication No. 2428937 A
[Non Patent Document 1]
3GPP TS 25.214 V7.3.0 (2006-12), 3rd Generation Partnership Project; Technical Specification Group Radio Access Network; Physical layer procedures (FDD) (Release 7)
[Non Patent Document 2]
3GPP TS 36.300 V8.1.0 (2007-06), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)

DISCLOSURE OF INVENTION

Technical Problem

Next, a case where each of the femto base stations 812A and 812B shown in FIG. 8 is installed inside a respective one of buildings 90A and 90B as shown in FIGS. 9A and 9B is analyzed. When a wireless signal enters a building from the outside and goes out from the inside of the building, the wireless signal attenuates by an amount corresponding to the penetration loss cause by the building (hereinafter called "building penetration loss"). In FIG. 9, the femto base station 812A and the mobile station 91A are located inside the building 90A having a small building penetration loss, and the femto base station 812B and the mobile station 91B are located inside the building 90B having a building penetration loss larger than that of the building 90A. Note that each of the buildings 90A and 90B has an internal space of the same size and the same structure, and made of the same material.

In this case, a common pilot signal CP1 transmitted by a macro base station 811 reaches the femto base station 812A while being attenuated little, and reaches the femto base station 812B while being considerably attenuated. Therefore, since the received power Pmacro of the common pilot signal CP1 is smaller in the femto base station 812B than in the femto base station 812A, the femto base station 812B sets the transmission power of the common pilot signal CP2B to a smaller value.

In this situation, assume a case where Poffset is set to the minimum possible value with which the femto base station 812A can provide appropriate communication quality (coverage) throughout the inside of the building 90A, and the set Poffset is applied to all the femto base stations 812A and 812B as a common constant value. In such a case, since the transmission power of the common pilot signal CP2B transmitted by the femto base station 812B becomes smaller, it is impossible to provide appropriate communication quality throughout the inside of the building 90B.

Accordingly, assume another case where, Poffset is set to the minimum possible value with which the femto base station 812B can provide appropriate communication quality (coverage) throughout the inside of the building 90B, and the set Poffset is applied to all the femto base stations 812A and 812B. In this case, since the transmission power of the common pilot signal CP2A transmitted by the femto base station 812A becomes larger, appropriate communication quality can be provided throughout the inside of the building 90A. However, since the transmission power of the common pilot signal CP2A is so large that the common pilot signal CP2A could interfere significantly with a mobile station 90C that is located outside the building 90A and is connected to the macrocell 801. As a result, it causes a problem that the quality of the downlink of the mobile station 90C deteriorates, or a problem that since the macro base station 811 increases the transmission power of a signal transmitted to the mobile station 90C to maintain the quality of the downlink of the mobile station 90C, the line capacity of the macrocell 801 is reduced. Therefore, it has been desired to develop a transmission power setting method for a common pilot signal with which a femto base station installed inside a building can provide appropriate communication quality throughout the inside of the building regardless of the building penetration loss of the building while suppressing the interference exerted on a mobile station(s) connected to a macro station located outside the building.

Next, data transmission on an uplink in the wireless communication system shown in FIG. 9 is analyzed. To perform fast data transmission on an uplink between the mobile station 91A and the femto base station 812A, the mobile station 91A needs to transmit a signal with a larger transmission power. However, if the transmission power of the mobile station 91A is too large, its transmission signal could interfere with the uplink between the macro base station 811 and the mobile station 91C. To cope with this, it is conceivable that a target received power sent from the mobile station 91A is set in the femto base station 812A, and that the data transmission speed and the transmission power of the mobile station 91A are controlled such that the received power from the mobile station 91A in the femto base station 812A does not exceed the target received power. By doing so, the interference to the uplink of the macro base station 811 might be suppressed.

Accordingly, assume a case where the target received power of the femto base station 812A is determined so that the interference exerted on the macro base station 811 by the transmission signal of the mobile station 91A is suppressed to or below a permissible level, and the same target received power is set in the femto base station 812B as in the femto base station 812A. With the setting like this, the mobile stations 91A and 91B can perform data transmission at the same data transmission speed. In such a case, since the building 90B has a larger building penetration loss than that of the building 90A, the interference exerted on the uplink between the macro base station 811 and the mobile station 91D by a transmission signal of the mobile station 91B becomes sufficiently smaller than the permissible level. That is, even if the mobile station 91B increases its transmission power to some extent to increase the data transmission speed, the interference exerted on the uplink of the macro base station 811 does not exceed the permissible level. However, since the common target received power is set in the femto base stations 812A and 812B, the mobile station 91B cannot increase the data transmission speed. Accordingly, it has been desired that the data transmission speed can be maximized (i.e., communication quality can be improved) regardless of the building penetration loss of a building in which the femto base station is installed while suppressing the interference exerted on a macro base station to or below a permissible level.

The present invention has been made based on the above-described findings, and an object of the present invention is to provide a wireless communication system, a base station, a radio resource management method, and a control program of a base station that perform radio resource management such as setting of the transmission power of a common pilot signal and a target received power in uplink data transmission, and are capable of providing appropriate communication quality inside a building in which a base station is installed regardless of the building penetration loss of the building while suppressing the interference caused by radio waves leaked outside the building.

Technical Solution

A wireless communication system in accordance with a first aspect of the present invention is a wireless communication system including a first base station that performs wireless communication with a mobile station. Further, the first base station receives an incoming radio signal, performs radio resource management based on a penetration loss of the radio signal, and communicates with the mobile station.

Further, a wireless communication system in accordance with a second aspect of the present invention is a wireless communication system including a first base station that performs wireless communication with a mobile station. Furthermore, the first base station receives a radio signal that passes through a structure and arrives at an installation place of the first base station, performs radio resource management based on a receiving state of the radio signal so that a leak power that is leaked from at least one of the first base station and the mobile station to an opposite side to the installation place through the structure becomes substantially invariant, and communicates with the mobile station.

Advantageous Effects

The receiving state of the radio signal in the first base station changes according to the magnitude of the penetration loss of the radio signal caused by the structure located between the transmission source of the radio signal and the first base station. Therefore, a wireless communication system in accordance with the first and second aspects of the present invention, which performs radio resource management according to the receiving state of the radio signal, can perform different radio resource management depending on the penetration loss of the structure separating the place in which the first base station is installed. In this way, for example, if the first base station is installed inside a building, which is an example of the structure causing the loss of a radio signal, the first base station can provide appropriate communication quality inside the building regardless of the building penetration loss while suppressing the interference leaked outside the building.

In accordance with the present invention, appropriate communication quality can be provided inside a building in which a base station is installed regardless of the building penetration loss of the building while suppressing the interference caused by radio waves leaked outside the building.

EXPLANATION OF REFERENCE

1 MACRO GATEWAY APPARATUS
2 FEMTO GATEWAY APPARATUS
3 MACRO BASE STATION
4 FEMTO BASE STATION
5 MACROCELL
6 FEMTOCELL
7-1 TO 7-4 MOBILE STATION
8 SIGNAL TRANSMITTING UNIT
10 NETWORK
30 ANTENNA
31 WIRELESS TRANSMISSION/RECEPTION UNIT
32 RECEPTION DATA PROCESSING UNIT
33 TRANSMISSION DATA PROCESSING UNIT
34 WIRED TRANSMISSION/RECEPTION UNIT
35 RADIO NETWORK CONTROL UNIT
36 MOBILE-STATION MODE RECEIVING UNIT
37 RADIO NETWORK CONTROL DATA SETTING UNIT
38 GPS RECEIVING UNIT
80 ANTENNA
81 TRANSMITTING UNIT
82 SIGNAL GENERATION UNIT

BEST MODE FOR CARRYING OUT THE INVENTION

Next, exemplary embodiments of the present invention are explained with reference to the drawings.

Figure 1:
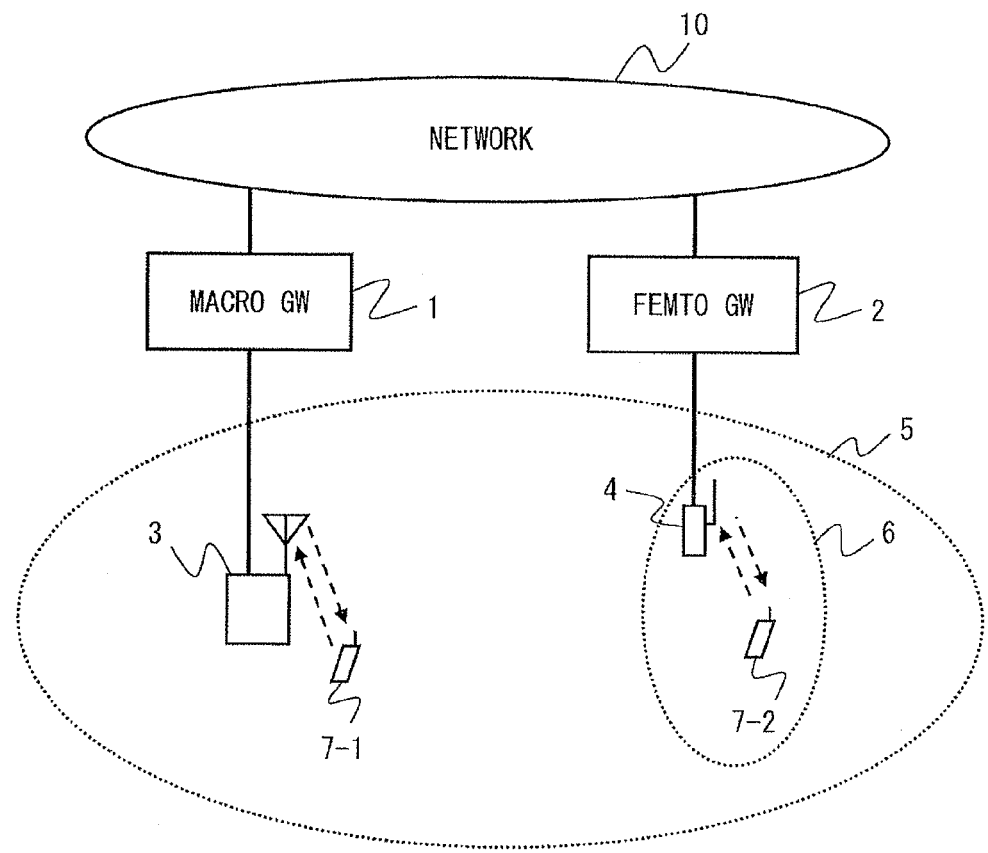
FIG. 1 shows a system configuration in accordance with first to third exemplary embodiments of the present invention.

FIG. 1 is a configuration diagram of a wireless communication system in accordance with first to third exemplary embodiments of the present invention. This wireless communication system includes macro gateway apparatus 1, femto gateway apparatus 2, a macro base station 3, a femto base station 4, a macrocell 5, a femtocell 6, and mobile stations 7-1 and 7-2. Among these, at least the femto base station 4 and the mobile station 7-2 are located inside a building (not shown) on the ground.

The macro base station 3 and the femto base station 4 form the macrocell 5 and the femtocell 6 respectively. The macro base station 3 communicates with the mobile station 7-1, and the femto base station 4 communicates with the mobile station 7-2. The number of cells formed by each of the macro base station 3 and the femto base station 4 may be more than one. However, each of the macro base station 3 and the femto base station 4 forms one cell in this exemplary embodiment.

The macro gateway apparatus 1 is connected to the macro base station 3. The femto gateway apparatus 2 is connected to the femto base station 4. Further, these gateway apparatuses 1 and 2, which are also connected to a network 10 in a higher layer, control communication and perform information transmission between the higher network 10 and the mobile stations 7-1 and 7-2 located within the cell of a subordinate base station.

The wireless communication system in accordance with this exemplary embodiment may also include a number of other macro base stations and femto base stations, macrocells and femtocells corresponding to those base stations, and mobile stations in addition to those shown in FIG. 1. However, their illustration is omitted in the figure.

Figure 2:
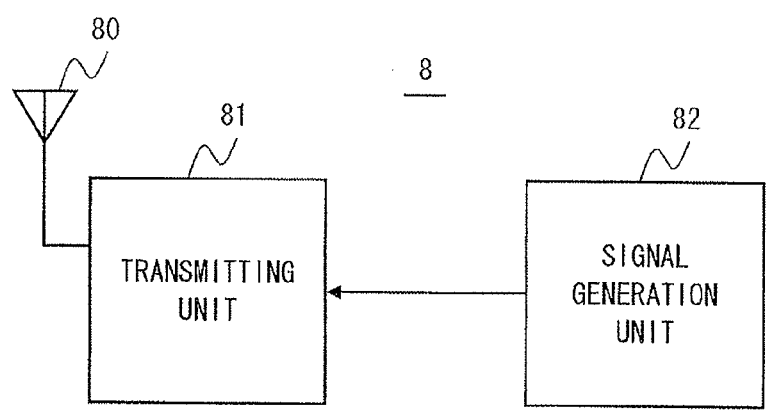
FIG. 2 is a configuration diagram of another wireless system in accordance with first to third exemplary embodiments of the present invention.

Further, a plurality of satellites (hereinafter called "GPS satellites") of a GPS (Global Positioning System) exist in the sky over the building in which the macro base station 3 is installed, and a signal transmission apparatus 8 installed in the satellite transmits a signal (hereinafter called "GPS signal") with a constant transmission power. FIG. 2 is a configuration diagram of a signal transmission apparatus 8 possessed by the GPS satellite. Referring to FIG. 2, the signal transmission apparatus 8 includes a signal generation unit 82, a transmitting unit 81, and an antenna 80. The signal generation unit 82 repeatedly generates a bit series, which is uniquely specified for each GPS satellite, at regular intervals, and sends the generated bit series to the transmitting unit 81. The transmitting unit 81 converts the bit series into a radio frequency signal, and transmits the radio frequency signal from the antenna 80.

All of the mobile stations 7-1 and 7-2 are permitted to connect to the macro base station 3. Meanwhile, the identifier of only the mobile station 7-2 is registered in the femto base station 4, and only the mobile station 7-2 is thereby permitted to connect to the femto base station 4 as a pre-registered mobile station.

To permit the connection only to specified mobile stations, the femto base station 4 transmits cell identification number information by using a common control channel, and also transmits connection restriction information indicating that it is a cell that permits the connection only to specified mobile stations. Meanwhile, the mobile station 7-2 retains the cell identification number information of a cell for which the connection is permitted. Further, when connection restriction information and cell identification number are being transmitted in the femtocell 6, if the transmitted cell identification number matches with the retained cell identification number, the mobile station 7-2 connects to the cell as a cell selection candidate.

The macro base station 3 and the femto base station 4 communicate with a mobile station by using the same radio frequency. Further, the macro base station 3 transmits a pilot signal with a constant transmission power by the CPICH (Common Pilot Channel) of the downlink in the macrocell 5. Meanwhile, the femto base station 4 autonomously sets the transmission power Ptx of a common pilot signal, and transmits a common pilot signal with the transmission power Ptx by the CPICH in the femtocell 6.

Further, each of the macro base station 3 and the femto base station 4 transmits downlink data to a mobile station by using a downlink data channel, and receives uplink data from a mobile station by using an uplink data channel.

Assume that, in the downlink transmission of the femto base station 4 of these communication schemes, the maximum value Ptx_total_max of the total amount of transmission power of all channels transmitted by the femto base station 4 in the femtocell 6 is expressed as "Min(Ptx+Dtotal, Ptx_total_limit) [dBm]". Note that Min(Ptx+Dtotal, Ptx_total_limit) indicates a smaller one of Ptx+Dtotal and Ptx_total_limit. Further, Dtotal is a fixed value (e.g., 10 dB). Ptx_total_limit is the transmission power capacity (upper limit of transmission power) of the femto base station. Further, the femto base station 4 controls the transmission power of the downlink data channel such that the total amount of transmission power does not exceed the above-described maximum value Ptx_total_max, and thereby performs data transmission with the maximum data transmission speed within the range in which the total amount of transmission power remains at or below Ptx_total_max. In this way, the ratio of the transmission power of the common pilot channel to the total transmission power of the femto base station 4 does not become smaller than a predetermined value. Further, by reducing Ptx, the total amount of transmission power of the femto base station 4 is also reduced, thus making it possible to suppress interference with a mobile station (e.g., mobile station 7-1) connected to other base stations (e.g., macro base station 3).

Meanwhile, in the uplink data reception of the femto base station 4, the data transmission speed is controlled by using a target received power RTWP_target in the femto base station 4. The mobile station 7-2 starts data transmission at a constant data transmission speed, and the femto base station 4 measures the total value RTWP of the received power in the femto base station 4 during the data reception. Then, if RTWP is smaller than RTWP_target, the femto base station 4 instructs the mobile station 7-2 to increase the data transmission speed, whereas if RTWP is larger than RTWP_target, the femto base station 4 instructs the mobile station 7-2 to decrease the data transmission speed. Meanwhile, the mobile station 7-2 increases/decreases according to the instruction, and thereby performs data transmission while increasing/decreasing the transmission power so that the transmission power per information bit become invariant. In this way, the femto base station 4 can receive uplink data at the maximum speed while preventing RTWP from significantly exceeding RTWP_target.

The transmission power of a common pilot signal Ptx and the target received power RTWP_target, which are wireless parameters for the radio resource management of the femto base station 4, are determined according to the receiving state of a radio signal (GPS signal) transmitted from a GPS satellite, which is a different wireless system from the wireless communication system in accordance with this exemplary embodiment, observed in the femto base station 4. Specific setting procedure of Ptx and RTWP_target in the femto base station 4 is explained in the following first to third exemplary embodiments.

Note that although this exemplary embodiment adopts a FDD (Frequency Division Duplex) mode in which different radio frequencies are used in the uplink and downlink, the present invention can be also practiced in a completely similar manner in embodiments using a TDD (Time Division Duplex) mode in which the same radio frequency is used in both the uplink and downlink in a time-division manner.

First Exemplary Embodiment

A wireless communication system in accordance with this exemplary embodiment may adopt any mode as the communication mode between a base station and a mobile station. However, a CDMA mode is adopted as the wireless access mode in a first exemplary embodiment, and each of the macro base station 3, the femto base station 4, and the mobile stations 7-1 and 7-2 spreads a transmission signal over a predetermined radio frequency band to transmit information. Further, the macro gateway apparatus (1 in FIG. 1) in accordance with the first exemplary embodiment is equipped with an RNC (Radio Network Controller) function. In this way, the macro gateway apparatus 1 notifies the macro base station 3 of a predetermined radio frequency, a transmission power of a common pilot signal, and the like of the macrocell 5.

Figure 3:
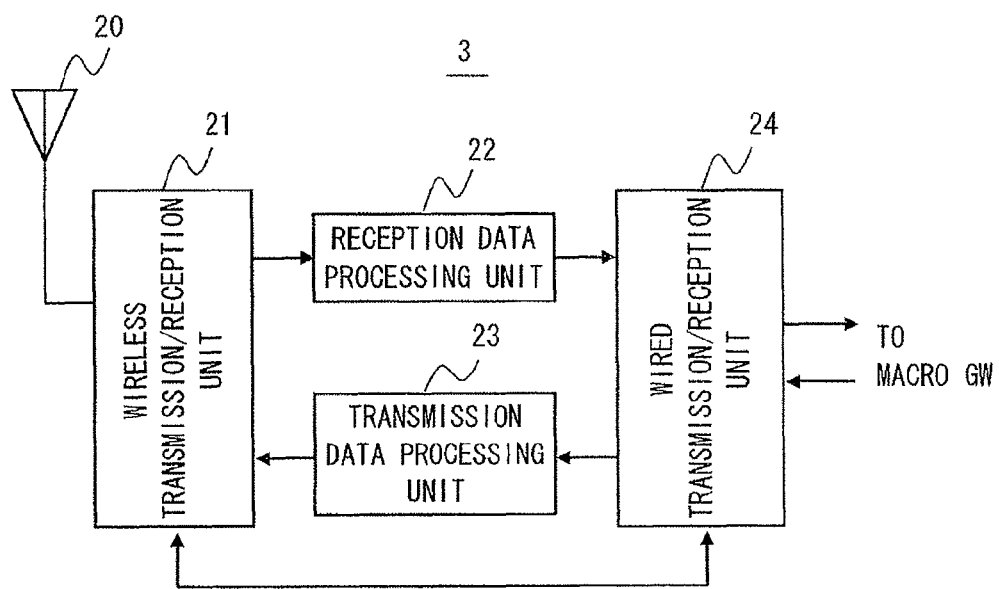
FIG. 3 shows a configuration of a macro base station in accordance with first and second exemplary embodiments of the present invention.

FIG. 3 shows an example of a configuration of a macro base station 3. Referring to FIG. 3, the macro base station in accordance with this exemplary embodiment includes an antenna 20, a wireless transmission/reception unit 21, a reception data processing unit 22, a transmission data processing unit 23, and a wired transmission/reception unit 24.

The wireless transmission/reception unit 21 receives a notification of the radio frequency, the transmission power of a common pilot signal, and the like of the formed cell from the macro gateway apparatus 1 through the wired transmission/reception unit 24, and transmits a common pilot signal based on the notification. Further, the wireless transmission/reception unit 21 receives downlink data from the macro gateway apparatus 1 through the wired transmission/reception unit 24 and the transmission data processing unit 23, and transmits the received downlink data through the antenna 20 toward the mobile station 7-1. Further, the wireless transmission/reception unit 21 receives uplink data from the mobile station 7-1 through the antenna 20, and transmits the received uplink data to the macro gateway apparatus 1 through the reception data processing unit 22 and the wired transmission/reception unit 24.

Figure 4:
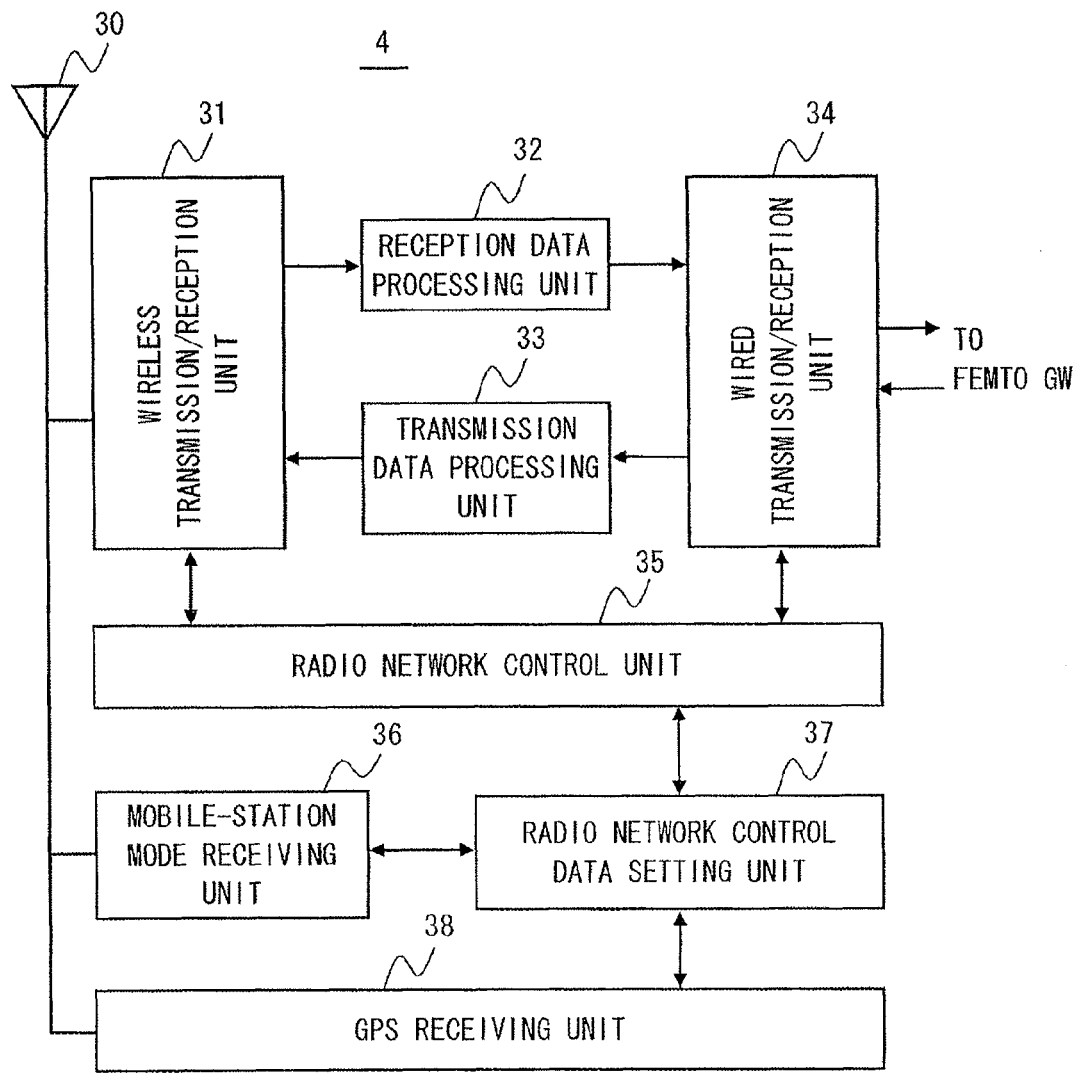
FIG. 4 shows a configuration of a femto base station in accordance with first to third exemplary embodiments of the present invention.

FIG. 4 shows an example of a configuration of a femto base station 4. Referring to FIG. 4, the femto base station 4 in accordance with this exemplary embodiment includes an antenna 30, a wireless transmission/reception unit 31, a reception data processing unit 32, a transmission data processing unit 33, a wired transmission/reception unit 34, a radio network control unit 35, a mobile-station mode receiving unit 36, a radio network control data setting unit 37, and a GPS receiving unit 38.

The mobile-station mode receiving unit 36 measures the received power Pmacro of a common pilot signal that is being transmitted in the macrocell 5 through the antenna 30. Further, the GPS receiving unit 38 measures the received power Pgps of a GPS signal through the antenna 30.

The radio network control data setting unit 37 receives a notification of Pmacro measured by the mobile-station mode receiving unit 36 and a notification of Pgps measured by the GPS receiving unit 38, determines the transmission power Ptx of a common pilot signal and a target received power RTWP_target in uplink data transmission from the mobile station in the femto base station 4, and sends them to the radio network control unit 35.

The radio network control unit 35, which is equipped with an RNC function, notifies the wireless transmission/reception unit 31 of a radio frequency to be used, the transmission power Ptx of a common pilot signal, and the target received power RTWP_target of an uplink data channel. Then, the wireless transmission/reception unit 31 receives the radio frequency, the transmission power Ptx, and the target received power RTWP_target from the radio network control unit 35, transmits a common pilot signal based on the notification, and thereby performs data transmission/reception of downlink/uplink data.

Figure 5:
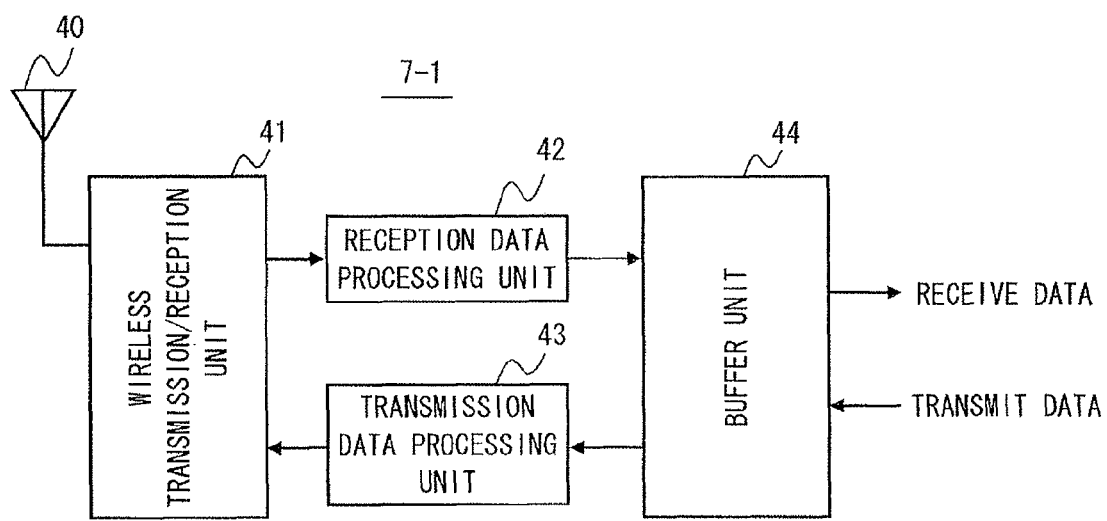
FIG. 5 shows a configuration of a base station in accordance with first to third exemplary embodiments of the present invention.

FIG. 5 shows an example of a configuration of a mobile station 7-1. Note that the other mobile station 7-2 may have a similar configuration. Referring to FIG. 5, the mobile station 7-1 in accordance with this exemplary embodiment includes an antenna 40, a wireless transmission/reception unit 41, a reception data processing unit 42, a transmission data processing unit 43, and a buffer unit 44.

The wireless transmission/reception unit 41 receives downlink data through the antenna 40, and transmits the received downlink data to the buffer unit 44 through the reception data processing unit. The downlink data stored in the buffer unit 44 is read out and used according to its purpose. Further, the wireless transmission/reception unit 41 receives uplink data stored in the buffer unit 44 through the transmission data processing unit 43, and transmits the received uplink data through the antenna 40 toward a base station.

Figure 6:
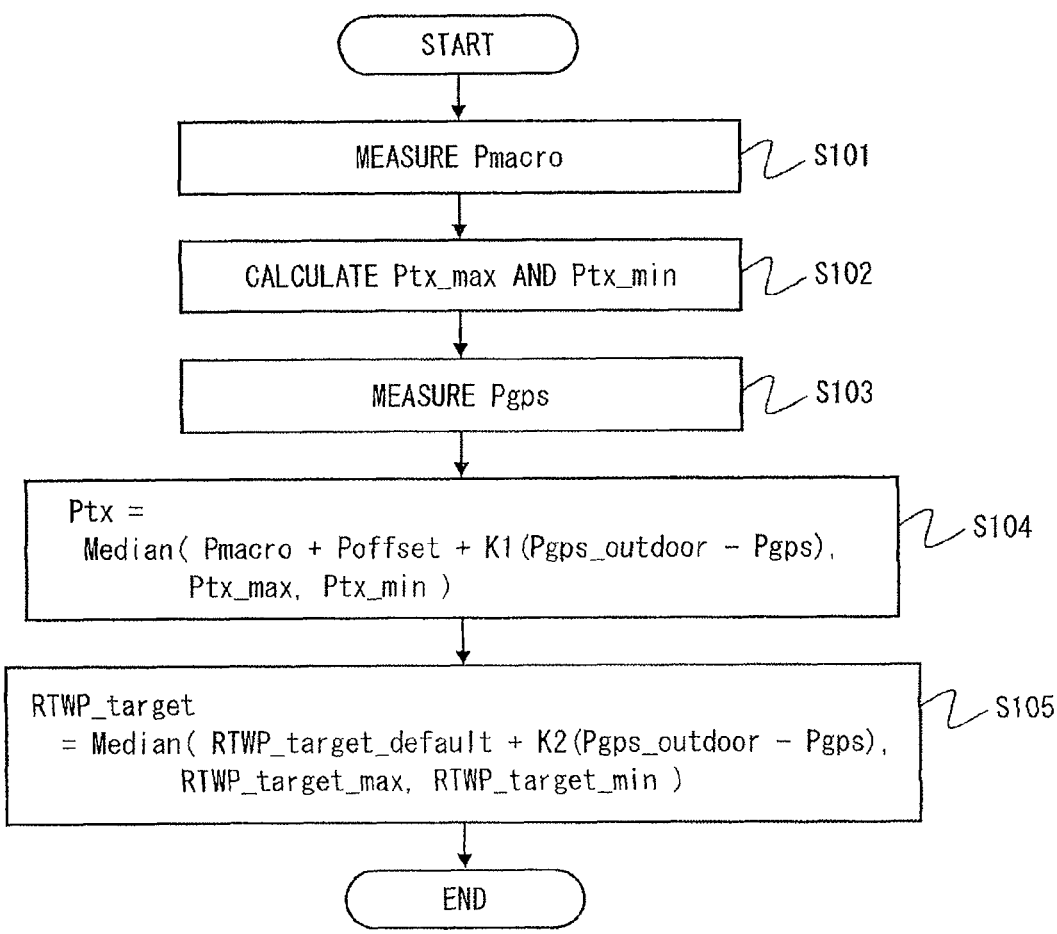
FIG. 6 shows setting procedure of wireless parameters in accordance with first to third exemplary embodiments of the present invention.

FIG. 6 is a flowchart showing an example of procedure through which the femto base station 4 in accordance with this exemplary embodiment sets the transmission power Ptx of a common pilot signal and the target received power RTWP_target.

Referring to FIG. 6, the femto base station 4 measures the received power Pmacro of a common pilot signal of the macro base station 3 (step S101). When the femto base station 4 performs measurement of Pmacro, it suspends the transmission of all radio signals and enters a mobile-station mode in which the femto base station 4 receives a common pilot signal transmitted from the macro base station 3. Note that in this flowchart, each symbol such as Pmacro represents a decibel value.

In a step S102, by using Pmacro as a reference, the maximum value Ptx_max and the minimum value Ptx_min of Ptx are determined as "Pmacro+Poffset_max" and "Pmacro+Poffset_min" respectively. However, the upper-limit value and the lower-limit value are specified for Ptx in advance, and the system is configured so that Ptx_max and Ptx_min do not exceed the upper-limit value and the lower-limit value respectively.

In a step S103, the received power Pgps of a GPS signal transmitted from the signal transmission apparatus 8 of a GPS satellite is measured. Note that the execution order of the steps S101 and S102 and the step S103 in FIG. 6 is defined merely for the sake of convenience, and the execution order of the step S103 is not restricted to the specific order. That is, the femto base station 4 may perform the step S103 before the steps S101 and S102, or may perform the step S103 simultaneously with the steps S101 and S102.

In a step S104, the transmission power Ptx of a common pilot signal is determined based on measurement results of Pmacro and Pgps. A specific calculating formula for Ptx is as follows.

$$Ptx = \text{Median}(Pmacro + Poffset + K1(Pgps\_outdoor - Pgps), Ptx\_max, Ptx\_min)$$

Note that the function Median(A, B, C) is a function to obtain the median among the three values A, B and C that are designated as arguments. Each of Poffset, Poffset_max, and Poffset_min used in steps S102 and S103 is a constant value satisfying a relation "Poffset_max>Poffset>Poffset_min". Further, K1 is a predetermined positive number.

Further, in a step S105, the target transmission power of a downlink data channel is determined based on measurement results of Pmacro and Pgps. A specific calculating formula for RTWP_target is as follows.

$$RTWP\_target = \text{Median}(RTWP\_target\_default + K2(Pgps\_outdoor - Pgps), RTWP\_target\_max, RTWP\_target\_min)$$

Note that RTWP_target_default is a fixed value that is determined such that the interference exerted on the macro base station 3 by the mobile station 7-2 falls to or below a permissible level when the femto base station 4 is installed outdoors in a place a certain distance away from the macro base station 3 and the mobile station 7-2 is positioned a certain distance away from the femto base station 4. Further, K2 is a predetermined positive number.

Pgps_outdoor used in the steps S104 and S105 is a value obtained by measuring the received power of a GPS signal outdoors. Therefore, (Pgps_outdoor−Pgps) in the calculating formula in the steps S104 and S105 is an estimated value of the penetration loss of a GPS signal caused by a building in which the femto base station 4 is installed.

Note that the value of Pgps_outdoor is roughly invariant regardless of the place provided that it is located outdoors on the ground in the area within which the femto base station 4 is installed. The received power value Pgps_outdoor is set in advance in the femto base station 4. Note that the received power value Pgps_outdoor may be set in a server (not shown) connected to the network 10 by an operator, and may be notified to the femto base station 4 by the server (not shown). In such a case, the femto base station 4 may set the received power value Pgps_outdoor upon the reception of a notification from the server (not shown). Further, if a plurality of GPS signals can be received from a plurality of GPS satellites in the step S103, the received power of a signal received from a satellite whose received power is the largest may be defined as Pgps. Further, the maximum value (upper-limit value) of Pgps measured in the step S103 may be defined as "Pgps_outdoor", and the minimum value (lower-limit value) of Pgps may be defined as "Pgps_outdoor−Const" (Const is a predetermined constant). In this way, even in the case where the measurement error of Ppgs is large, it is still possible to prevent Ptx from being set to an abnormal value.

Further, K1 is set to 2 in the step S104. In this way, when the frequency of the GPS signal is roughly the same as that of the frequency of a signal transmitted/received between the femto base station 4 and the mobile station 7-1 and the building penetration loss of these signals are thereby roughly the same as each other, the electrical power leaked from the femto base station 4 to the outside of the building becomes substantially invariant. The reason for this is explained hereinafter. Assuming that the building penetration loss L is expressed as "L=Pgps_outdoor−Pgps" and that Pmarcro in the case where the building does not exist is defined as "Pmacro_outdoor", the formula "Pmacro=Pmacro_outdoor−L" is obtained. In this way, if the calculation is to be performed while ignoring the maximum value and the minimum value of Ptx, it is expressed as "Ptx=Pmacro+Poffset+2L=Pmacro_outdoor+Poffset+L". Further, if a common pilot signal is leaked outside the building, the signal is attenuated by the building penetration loss L and the leaked power is thereby determined by Pmacro_outdoor+Poffset. That is, the amount of power of a common pilot signal Ptx leaked outside the building in which the femto base station 4 is installed is invariant regardless of L.

Further, K2 is set to 1 in the step S105. In this way, although the power transmitted by the mobile station 7-2 increases by an amount equivalent to the building penetration loss, the amount of power leaked from the signal to the outside of the building decreases by an amount equivalent to the building penetration loss and thereby becomes substantially invariant regardless of the building penetration loss.

Further, in the steps S104 and S105, when the frequency of the transmission signal of a GPS satellite is significantly different from the frequency of a signal transmitted/received between the femto base station 4 and the mobile station 7-1 and the building penetration loss of these signals are thereby different from each other, K1 and K2 may be set with consideration given to the difference in the building penetration losses.

Note that K1 and K2, which are used in the calculation for determining the transmission power Ptx of a common pilot signal and the target transmission power RTWP_target of a downlink data channel, may be set to a value greater than zero in advance before the femto base station 4 is installed inside the building (for example, when shipped from a factory or sold as a product). Alternatively, K1 and K2 may be notified from a femto GW2 or other management servers existing on the network to the femto base station 4 when the femto base station 4 is connected to the femto GW2 installed inside a building.

As described above, the femto base station 4 in accordance with this exemplary embodiment exploits the fact that the received power of a GPS signal decreases with the increase in the building penetration loss of the building in which the femto base station 4 is installed. Therefore, when the building penetration loss is large, the femto base station 4 sets the transmission power of a first common pilot signal a large value according to the magnitude of the building penetration loss. By setting the transmission power of a common pilot signal according to the magnitude of the building penetration loss in this way, it is possible to provide appropriate communication quality inside a building without increasing the interference leaked outside the building.

Furthermore, when the building penetration loss is larger, the femto base station 4 in accordance with this exemplary embodiment sets the target received power of an uplink data channel to a large value according to the magnitude of the building penetration loss. By setting the target received power according to the magnitude of the building penetration loss in this way, it is possible to increase the uplink data transmission speed (i.e., improve the communication quality) without increasing the interference leaked outside the building when a mobile station 7-2 located inside the same building as the femto base station 4 transmits uplink data to the femto base station 4.

Second Exemplary Embodiment

In a second exemplary embodiment, the term "Pgps_outdoor−Pgps" is replaced by another term $L(T)$ or $L(E)$ when Ptx and RTWP_target is calculated in the steps S104 and S105 of FIG. 6 showing the setting procedure of Ptx and RTWP_target. The configuration of the macro base station 3, the femto base station 4, and the mobile stations 7-1 and 7-2 may be the same as that of the first exemplary embodiment except for this difference. However, the GPS receiving unit 38 possessed by the femto base station 4 in this exemplary embodiment is configured to receive a signal from a GPS signal to perform position measurement.

Firstly, an example where $L(T)$ is used in place of the term "Pgps_outdoor−Pgps" is explained. $L(T)$ is a parameter that is determined by reflecting the time required by the GPS receiving unit 38 to perform the position measurement. When the GPS receiving unit 38 receives an instruction for position measurement from the radio network control data setting unit 37, the GPS receiving unit 38 receives a plurality of GPS signals (bit series) each transmitted from the signal transmission apparatus 8 of each of a plurality of GPS satellites and calculates a difference(s) between receiving timings of the bit series from the GPS satellites. At this point, if the received power of the GPS signal is small, the GPS receiving unit 38 adds up received signals over a long time. Then, when predetermined reliability is obtained, the GPS receiving unit 38 calculates the receiving timing difference and measures a position based on the calculated receiving timing difference. The GPS receiving unit 38 notifies the measured position information to the radio network control data setting unit 37. The radio network control data setting unit 37 measures a required time T from the instruction of the position measurement to the reception of the notification of the position information, and sets $L(T)$ according to the length of the measured time. For example, when T is less than 3 seconds, $L(T)=0$ [dB]; when T is no less than 3 seconds and less than 7 seconds, $L(T)=5$ [dB]; and when T is no less than 7 seconds, $L(T)=10$ [dB].

As described above, the time T required to obtain position information with predetermined reliability tends to vary depending on the magnitude of the received power of a GPS signal. That is, the time T tends to become shorter with the increase in the received power of a GPS signal, and become longer with the decrease in the received power of a GPS signal. Therefore, instead of directly measuring the received power of a GPS signal as shown in the first exemplary embodiment, the penetration loss caused by a building in which the femto base station 4 is installed can be indirectly estimated by using the time T on which the received power of a GPS signal is reflected. In this way, the femto base station 4 in accordance with this exemplary embodiment can also provide appropriate communication quality without increasing the interference leaked outside the building.

Next, an example where $L(E)$ is used in place of the term "Pgps_outdoor−Pgps" is explained. $L(E)$ is a parameter that is determined by reflecting an error of position information measured by the GPS receiving unit 38. When the GPS receiving unit 38 receives an instruction for position measurement within a fixed time from the radio network control data setting unit 37, the GPS receiving unit 38 adds up received signals within the instructed time, measures and outputs the position, and also outputs its error information. The measured position information and error information are notified to the radio network control data setting unit 37. The radio network control data setting unit 37 sets $L(E)$ according to the error information. For example, when E is less than 3 meters, $L(E)=0$ [dB]; when E is no less than 3 meters and less than 30 meters, $L(E)=5$ [dB]; and when E is no less than 30 meters, $L(T)=10$ [dB].

As described above, the accuracy of the position information that can be measured within a predetermined fixed time tends to vary depending on the magnitude of the received power of a GPS signal. That is, the accuracy improves with the increase in the received power of a GPS signal, and deteriorates with the decrease in the received power of a GPS signal. Therefore, instead of directly measuring the received power of a GPS signal as shown in the first exemplary embodiment, the penetration loss by a building in which the femto base station 4 is installed can be indirectly estimated by using the error information on which the received power of a GPS signal is reflected. In this way, the femto base station 4 in accordance with this exemplary embodiment can also provide appropriate communication quality without increasing the interference leaked outside the building.

Third Exemplary Embodiment

Although a WCDMA mode is adopted as a communication mode between a base station and a mobile station in the first and second exemplary embodiments, a single carrier FDMA (Frequency Division Multiple Access) mode and an OFDM (Orthogonal Frequency Division Multiplexing) mode are adopted on the uplink and downlink respectively in a third exemplary embodiment. Further, the radio frequency band is divided into a plurality of PRBs (Physical Resource Blocks), and a scheduler provided in the macro base station 3 and femto base station 4 performs the assignment of the PRBs. Each of the macro base station 3 and the femto base station 4 performs data communication with a mobile station by using an assigned PRB.

In such a case, the transmission power of each PRB in the downlink is set to a value obtained by adding a fixed offset value Pprb to the transmission power Ptx of a common pilot signal, i.e., Ptx+Pprb [dBm]. Further, the transmission power of each PRB may be increased/decreased according to channel quality and/or the amount of transmission data by using Ptx+Pprb as a reference. Meanwhile, in the uplink, although the target value of the received power of each PRB in the femto base station 4 is the target received power RTWP_target, the transmission power of each PRB in a mobile station may be decreased according to channel quality and/or the amount of transmission data.

Although the macro gateway apparatus 1 in accordance with the first exemplary embodiment is equipped with the RNC (Radio Network Controller) function, the macro gateway apparatus 1 in accordance with the third exemplary embodiment does not have the RNC function. Instead, the macro base station 3 is equipped with the RNC function.

Figure 7:
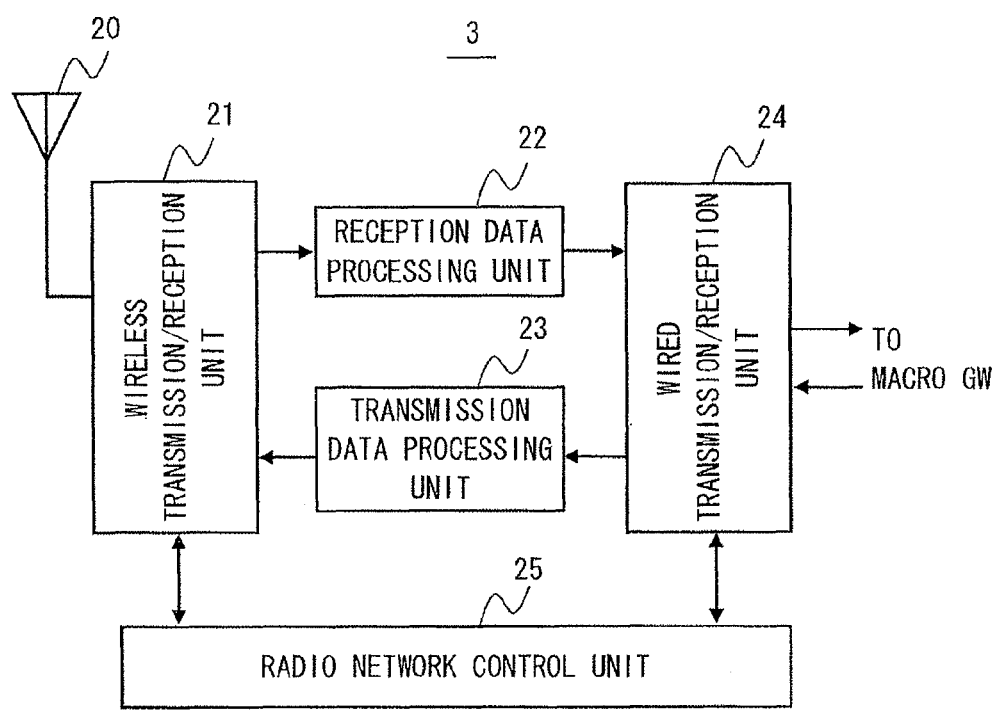
FIG. 7 shows a configuration of a macro base station in accordance with third exemplary embodiment of the present invention.
Figure 8:
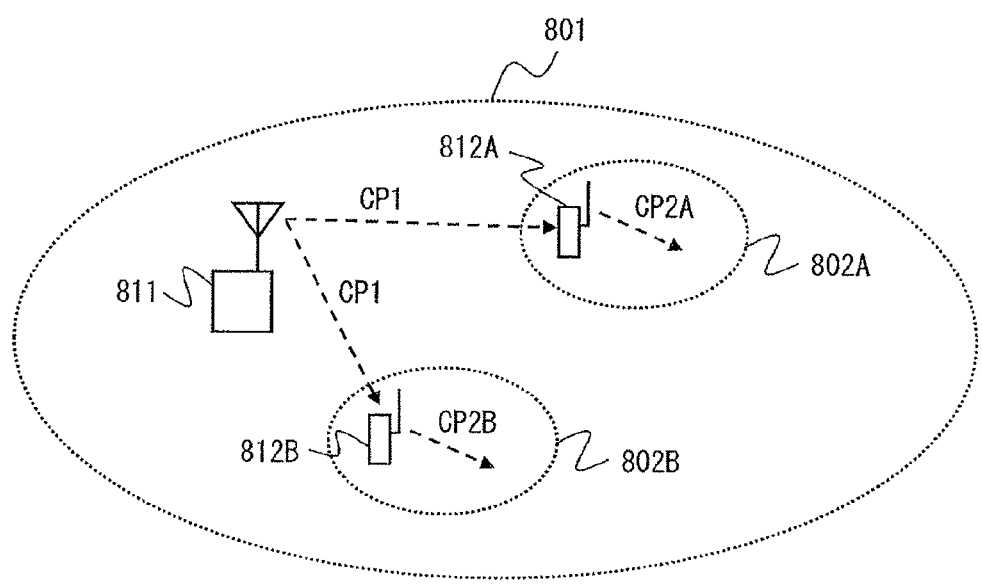
FIG. 8 is a system configuration diagram for explaining related art.
Figure 9:
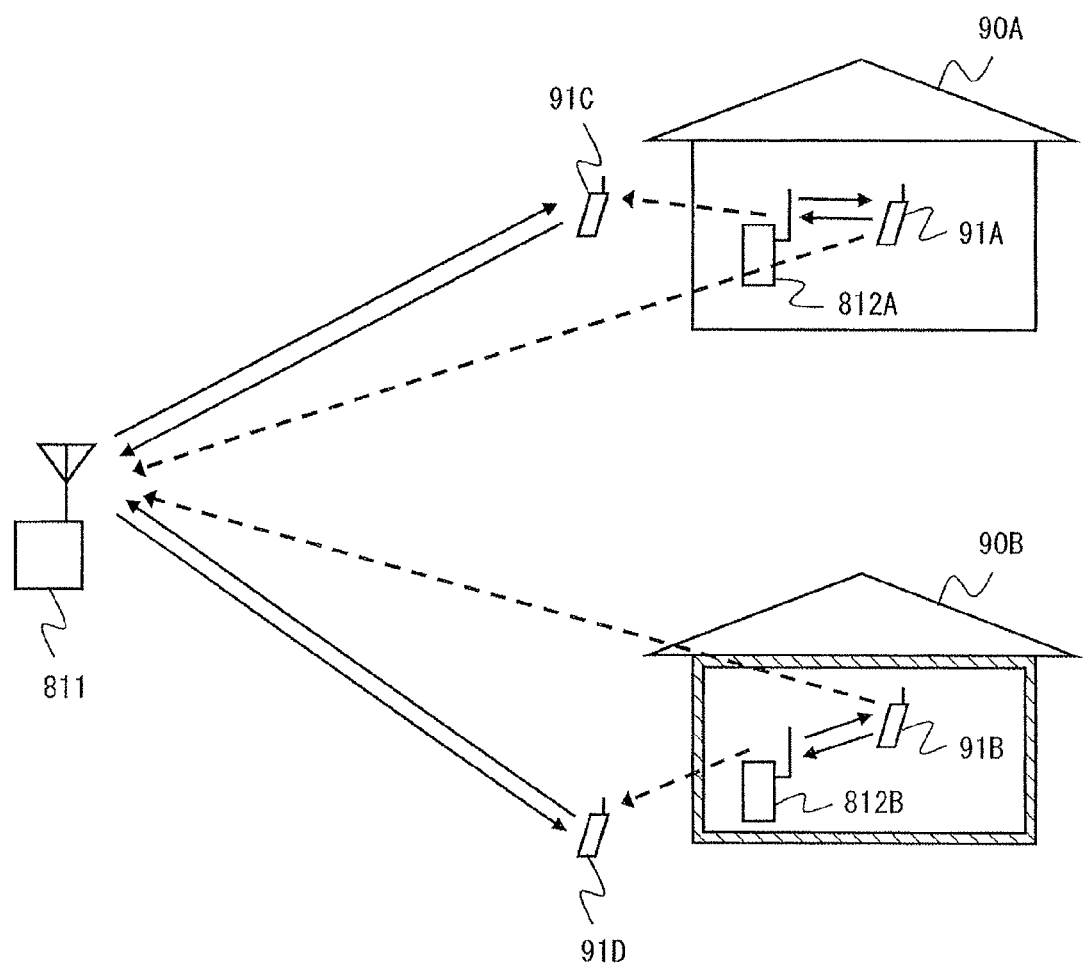
FIG. 9 shows a femto base station and a mobile station installed inside a building, and a macro base station and a mobile station installed outdoors.

FIG. 7 shows an example of a configuration of a macro base station 3 in accordance with a third exemplary embodiment. Referring to FIG. 7, the macro base station 3 in accordance with this exemplary embodiment includes a radio network control unit 25. The radio network control unit 25 retains control parameters to be used in each cell, such as a frequency channel and a transmission power value of a pilot signal, and notifies these parameters to the wireless transmission/reception unit 21. The wireless transmission/reception unit 21 in FIG. 7 uses the control parameters, which are not notified from the macro gateway apparatus 1 but are notified from the radio network control unit 25, to perform wireless communication with a mobile station.

Note that the other components in FIG. 7 are similar to those of the macro base station 3 in accordance with the first exemplary embodiment explained with reference to FIG. 2 except for a difference in the modulation mode used in the wireless transmission/reception unit 21. Further, the configuration of the femto base station 4 and the mobile stations 7-1 and 7-2 in accordance with this exemplary embodiment may be the same as those in either one of the above-described first and second exemplary embodiments. Further, the setting procedure of wireless parameters in the femto base station 4, i.e., the setting procedure of the transmission power Ptx of a common pilot signal and the target received power RTWP_target may be also the same as those in either one of the above-described first and second exemplary embodiments.

Other Exemplary Embodiments

Additional embodiments modified from the above-described first to third exemplary embodiments are listed hereinafter. In the first to third exemplary embodiments, specific examples in which the femto base station 4 receives a GPS signal and sets the transmission power Ptx of a common pilot signal and the target received power RTWP_target based on the directly-measured received power of a GPS signal or other parameters reflecting the magnitude of the received power of a GPS signal (time required to measure a position or an error of position measurement) are explained. However, the femto base station 4 may receive a signal other than a GPS signal transmitted from other wireless systems, and set the transmission power Ptx of a common pilot signal and the target received power RTWP_target by using the received power of that signal or a parameter on which the received power of that signal is reflected. Specifically, similarly to the GPS signal, it is preferable to receive a wireless signal whose received power can be regarded to be invariant regardless of the place provided that it is located outdoors on the ground in the area within which the femto base station 4 is installed (e.g., internal region of a specific country or the like). For example, a signal transmitted from an artificial satellite other than the GPS satellite may be received.

Further, in the first to third exemplary embodiments, specific examples in which the femto base station 4 sets both the transmission power Ptx of a common pilot signal and the target received power RTWP_target based directly or indirectly on the received power of a GPS signal are explained. However, the femto base station 4 may set at least one of the transmission power Ptx of a common pilot signal and the target received power RTWP_target based on the received power of a GPS signal.

For example, in the case where the femto base station 4 sets at least the transmission power Ptx of a common pilot signal based on the received power of a GPS signal, it provides such an advantageous effect that at least the interference exerted on the downlink between the macro base station 3 and the mobile station 7-1 is suppressed while providing appropriate communication quality inside the building in which the femto base station 4 is installed. Further, in the case where the femto base station 4 sets at least the target received power RTWP_target of a common pilot signal based on the received power of a GPS signal, it provides such an advantageous effect that at least the interference exerted on the uplink between the macro base station 3 and the mobile station 7-1 is suppressed while providing appropriate communication quality inside the building in which the femto base station 4 is installed.

Further, the femto base station 4 described in the first to third exemplary embodiments determines the maximum value Ptx_max and the minimum value Ptx_max of the transmission power of a common pilot signal according to the received power Pmacro of the pilot signal transmitted from the macro base station 3. In accordance with the configuration like this, when the signal strength of a pilot signal transmitted from the macro base station 3 is very weak in the vicinity of the femto base station 4, the maximum value Ptx_max of the pilot signal of the femto base station 4 can be lowered according to this weak strength. Therefore, it can provide such an advantageous effect that the interference of the femto base station 4 to a mobile station that is located near the femto base station 4 but is connected to the macro base station 3 instead of the femto base station 4 can be suppressed.

However, both of the maximum value Ptx_max and the minimum value Ptx_max do not have to be necessarily determined by using Pmacro as a reference. For example, only the maximum value Ptx_max may be determined according to Pmacro while the minimum value Ptx_max may be fixed at a predetermined constant value. Further, both of the maximum value Ptx_max and the minimum value Ptx_max may be set to predetermined fixed values.

Further, in the first to third exemplary embodiments, examples in which the femto base station 4 determines the transmission power Ptx of a common pilot signal by using the measurement result of the received power Pmacro of a common pilot signal transmitted from the macro base station 3 are shown. However, the received power Pmacro of a pilot signal transmitted from the macro base station 3 is merely one of the parameters indicating the reception quality of a signal transmitted from the macro base station 3. For example, instead of or in addition of using the received power Pmacro of a common pilot signal, the femto base station 4 may use other parameters such as the reception SIR (Signal to Interference Ratio) of a common pilot signal and BER (Bit Error Rate) of a downlink signal. For example, when the reception SIR (hereinafter called "SIRmacro") of a common pilot signal transmitted from the macro base station 3 is used, SIRmacro should be measured in the step S101 of FIG. 6. Further, in the step S102 of FIG. 6, Ptx_max and Ptx_min should be calculated by "SIRmacro+Poffset_max2" and "SIRmacro+Poffset_min2" respectively. Furthermore, "Pmacro+Poffset" in the step S103 of FIG. 6 should be replaced by "SIRmacro+Poffset2". Note that each of Poffset_max2, Poffset_min2, and Poffset2 is a constant value satisfying a relation "Poffset_max2>Poffset2>Poffset min2".

Further, the setting procedure of the transmission power Ptx of a pilot signal and the target received power RTWP_target performed by the femto base station 4 described in the first to third exemplary embodiments can be implemented by executing a program for base-station control in a computer such as a microprocessor. In the case of the first exemplary embodiment, for example, the measurement of the reception level Pmacro of a pilot signal transmitted from the femto base station 4 may be carried out by the mobile-station mode receiving unit 36 based on the control of a computer executing a base-station control program while the measurement of the reception level Pgps of a GPS signal may be carried out by the GPS receiving unit 38. Further, the transmission power Ptx of a pilot signal and the target received power RTWP_target may be calculated by using the measured Pmacro and Pgps in a computer, and the adjustment of the transmission power of a pilot signal by the femto base station 4 and the control of the transmission power to the mobile station 7-2 may be also performed base on the control of a computer.

Furthermore, examples where the femto base station 4 is installed in a building are explained in the above-described exemplary embodiments of the present invention. However, the present invention is also applicable to other cases where the femto base station 4 is installed in a place that is separated by some kind of structure including the inner space of an artificial structure such as an underground shopping complex, an underground parking lot, a tunnel, and an arcade and the like, and the inner space of natural structure instead of or in addition to the inner space of buildings intended for living space of people and/or storing space of articles.

Further, the present invention is not limited to the above-described exemplary embodiments, and needless to say, various modifications can be made within the limits that do not depart from the spirit of the present invention described above.

This application is based upon and claims the benefit of priority from Japanese patent application No. 2007-273640, filed on Oct. 22, 2007, the disclosure of which is incorporated herein in its entirety by reference.

INDUSTRIAL APPLICABILITY

The present invention is capable to be applied to a wireless communication system, in particular a wireless communication system, a base station, a radio resource management method, and a control program of a base station in which at least one of base stations autonomously performs radio resource management.

The invention claimed is:

1. A wireless communication system comprising a first base station that performs wireless communication with a mobile station,
   wherein the first base station receives an incoming radio signal, estimates a penetration loss of the radio signal caused by a structure located between a radio signal transmission source of the radio signal and the first base station, and performs radio resource management based on the estimated penetration loss of the radio signal, wherein the estimated penetration loss is a loss factor corresponding to a part of a total path loss between the radio signal transmission source and the first base station;
   wherein the radio signal transmission source is an apparatus of one of a plurality of artificial satellites constituting a positioning system; and
   wherein the radio signal is a positioning signal transmitted from the one of the plurality of artificial satellites.

2. The wireless communication system according to claim 1, wherein the radio resource management includes setting a transmission power of a first common pilot signal used by the first base station to perform communication with the mobile station based on the estimated penetration loss.

3. The wireless communication system according to claim 2, wherein the first base station retains a reference value of a received power of a radio signal exhibited outdoors on ground in advance, and estimates the penetration loss based on a difference between the reference value and a received power level of the radio signal.

4. The wireless communication system according to claim 2, wherein the first base station sets the transmission power such that the transmission power increases with a decrease in a received power of the radio signal.

5. The wireless communication system according to claim 2, wherein
   the first base station measures a position based on the positioning signal, and sets the transmission power such that the transmission power increases with an increase in a time required measure a position or with a decrease in accuracy of a measured position.

6. The wireless communication system according to claim 2, wherein the first base station measures a received power or a reception SIR of a second common pilot signal transmitted from a second base station included in the wireless communication system, and sets a transmission power of the first common pilot signal based on a result of the measurement.

7. The wireless communication system according to claim 6, wherein assuming that a reference value of a received power of the radio signal and a measured value of the received power of the radio signal are Pgps_outdoor and Pgps respectively, and that K1 is a constant value greater than zero,
   the first base station calculates the transmission power by adding K1 (Pgps_outdoor−Pgps) to a value determined according to a received power of the second pilot signal.

8. The wireless communication system according to claim 1, wherein the first base station performs radio resource management so that a leak power leaked from at least one of the first base station and the mobile station to outside of the structure becomes substantially invariant.

9. The wireless communication system according to claim 1, wherein the radio signal is a signal whose received power on ground in an outdoor region in which the first base station is installed is substantially invariant regardless of a place.

10. The wireless communication system according to claim 1, wherein the radio resource management includes setting a target received power of an uplink signal used in uplink data transmission from the mobile station in the first base station based on the estimated penetration loss.

11. The wireless communication system according to claim 10, wherein the first base station retains a reference value of a received power of a radio signal exhibited outdoors on ground in advance, and estimates the penetration loss based on a difference between the reference value and a received power level of the radio signal.

12. The wireless communication system according to claim 10, wherein the first base station sets the target received power such that the target received power increases with a decrease in a received power of the radio signal.

13. The wireless communication system according to claim 1, wherein a CDMA mode is used as a wireless access mode.

14. The wireless communication system according to claim 1, wherein, in communication between the first base station and a mobile station, a radio frequency band is divided into a plurality of resource blocks, and information is transmitted by using one or more than one resource block.

15. A base station that is used in a wireless communication system and performs wireless communication with a mobile station, comprising:
a reception unit being configured to receive an incoming radio signal comprising a positioning signal transmitted by a radio signal transmission source which is an apparatus of one of a plurality of artificial satellites constituting a positioning system;
a radio network control unit being configured to estimate a penetration loss of the radio signal, received by the reception unit, caused by a structure located between the radio signal transmission source of the radio signal and the base station and to perform radio resource management based on the estimated penetration loss of the radio signal received by the reception unit, wherein the estimated penetration loss is a loss factor corresponding to a part of a total path loss between the radio signal transmission source and the base station; and
a wireless transmission reception unit being configured to communicate with the mobile station according to control by the radio network control unit.

16. The base station according to claim 15, wherein the radio network control unit sets a transmission power of a first common pilot signal used to perform communication with the mobile station based on the estimated penetration loss.

17. The base station according to claim 16, wherein the radio network control unit retains a reference value of a received power of a radio signal exhibited outdoors on ground in advance, and estimates the penetration loss based on a difference between the reference value and a received power level of the radio signal measured by the reception unit.

18. The base station according to claim 17, wherein
the reception unit performs position measurement based on the positioning signal, and
the radio network control unit sets the transmission power such that the transmission power increases with an increase in a time required for the position measurement or with a decrease in accuracy of a position measured by the position measurement.

19. The base station according to claim 16, wherein a received power or a reception SIR of a second common pilot signal transmitted from a second base station included in the wireless communication system is measured, and the first transmission power is set based on a result of the measurement.

20. The base station according to claim 15, wherein the radio network control unit sets a target received power based on an estimation result of the penetration loss, the target received power being a target value of a received power of an uplink signal used in uplink data transmission from the mobile station.

21. The base station according to claim 15, wherein the radio network control unit performs radio resource management so that a leak power leaked from at least one of the base station and the mobile station to outside of the structure becomes substantially invariant.

22. A radio resource management method used in a wireless communication system and performed by a base station that performs wireless communication with a mobile station, the method comprising:
receiving a radio signal arriving at an installation place of the base station, the radio signal comprising a positioning signal transmitted by a radio signal transmission source which is an apparatus of one of a plurality of artificial satellites constituting a positioning system;
estimating a penetration loss of the radio signal caused by a structure located between the radio signal transmission source of the radio signal and the base station, wherein the estimated penetration loss is a loss factor corresponding to a part of a total path loss between the radio signal transmission source and the base station;
performing radio resource management based on the estimated penetration loss of the radio signal; and
communicating with the mobile station based on a wireless parameter determined by the radio resource management.

23. The radio resource management method according to claim 22,
wherein the wireless parameter is a transmission power of a first common pilot signal used by the base station to perform communication with the mobile station, and
wherein, in the radio resource management, a reference value of a received power of a radio signal exhibited outdoors on ground is retained in advance, so that the penetration loss is estimated based on a difference between the reference value and a received power level of the radio signal, and
a transmission power of the first common pilot signal is set based on an estimation result of the penetration loss.

24. The radio resource management method according to claim 22,
wherein the wireless parameter is a target received power, the target received power being a target value of a received power of an uplink signal used in uplink data transmission from the mobile station, and
wherein, in the radio resource management, a reference value of a received power of a radio signal exhibited outdoors on ground is retained in advance, so that the penetration loss is estimated based on a difference between the reference value and a received power level of the radio signal, and
the target received power is set based on an estimation result of the penetration loss.

25. The radio resource management method according to claim 22,
wherein the wireless parameter is a transmission power of a first common pilot signal used by the base station to perform communication with the mobile station, and
wherein, in the radio resource management, the transmission power is set such that the transmission power increases with an increase in a time required for the position measurement performed based on the positioning signal or with a decrease in accuracy of a position measured by the position measurement.

26. The radio resource management method according to claim 22, wherein radio resource management is performed so that a leak power leaked from at least one of the base station and the mobile station to outside of the structure becomes substantially invariant.

27. A non-transitory computer readable media storing a base station control program that causes a computer to execute control processing for a base station used in a wireless communication system, the base station comprising a wireless transmission reception unit that performs wireless communication with a mobile station, and a reception unit that receives a radio signal arriving at an installation place of the base station, the control processing comprising:
a process of causing the reception unit to receive the radio signal;
a process of estimating a penetration loss of the radio signal caused by a structure located between a radio signal transmission source of the radio signal and the base station, wherein the estimated penetration loss is a loss factor corresponding to a part of a total loss between the radio signal transmission source and the base station;
a process of performing radio resource management based on the estimated penetration loss of the radio signal received by the reception unit; and
a process of causing the wireless transmission reception unit to execute communication with the mobile station based on a wireless parameter determined by the radio resource management;
wherein the radio signal transmission source is an apparatus of one of a plurality of artificial satellites constituting a positioning system; and
wherein the radio signal is a positioning signal transmitted from the one of the plurality of artificial satellites.

28. A wireless communication system comprising a first base station that performs wireless communication with a mobile station, wherein
the first base station receives a radio signal that passes through a structure and arrives at an installation place of the first base station, estimates a penetration loss of the radio signal caused by the structure located between a radio signal transmission source of the radio signal and the first base station, performs radio resource management based on the estimated penetration loss of the radio signal so that a leak power that is leaked from at least one of the first base station and the mobile station to an opposite side to the installation place through the structure becomes substantially invariant, and communicates with the mobile station, wherein the estimated penetration loss is a loss factor corresponding to a past of a total path loss between the radio signal transmission source and the first base station;
wherein the radio signal transmission source is an apparatus of one of a plurality of artificial satellites constituting a positioning system; and
wherein the radio signal is a positioning signal transmitted from the one of the plurality of artificial satellites.

29. A base station that is used in a wireless communication system and performs wireless communication with a mobile station, comprising:
a reception unit which is configured to receive an incoming radio signal that passes through a structure and arrives at an installation place of the base station;
a radio network control unit which is configured to estimate a penetration loss of the radio signal caused by the structure located between a radio signal transmission source of the radio signal and the base station and to perform radio resource management based on the estimated penetration loss of the radio signal so that a leak power that is leaked from at least one of the base station and the mobile station to an opposite side to the installation place through the structure becomes substantially invariant, wherein the estimated penetration loss is a loss factor corresponding to a part of a total path loss between the radio signal transmission source and the base station; and
a wireless transmission reception unit which is configured to communicate with the mobile station according to control by the radio network control unit;
wherein the radio signal transmission source is an apparatus of one of a plurality of artificial satellites constituting a positioning system; and
wherein the radio signal is a positioning signal transmitted from the one of the plurality of artificial satellites.

30. A radio resource management method used in a wireless communication system and performed by a base station that performs wireless communication with a mobile station, the method comprising:
receiving a radio signal arriving at an installation place of the base station;
estimating a penetration loss of the radio signal caused by the structure located between a radio signal transmission source of the radio signal and the base station, wherein the estimated penetration loss is a loss factor corresponding to a part of a total path loss between the radio signal transmission source and the base station;
performing radio resource management based on the estimated penetration loss of the radio signal so that a leak power that is leaked from at least one of the base station and the mobile station to an opposite side to the installation place through the structure becomes substantially invariant; and
performing communication with the mobile station based on a wireless parameter determined by the radio resource management;
wherein the radio signal transmission source is an apparatus of one of a plurality of artificial satellites constituting a positioning system; and
wherein the radio signal is a positioning signal transmitted from the one of the plurality of artificial satellites.

* * * * *